July 8, 1941.　　　R. E. MANLEY　　　2,248,769
FLUID POWER TRANSMISSION SYSTEM
Filed Aug. 12, 1940　　　2 Sheets-Sheet 1
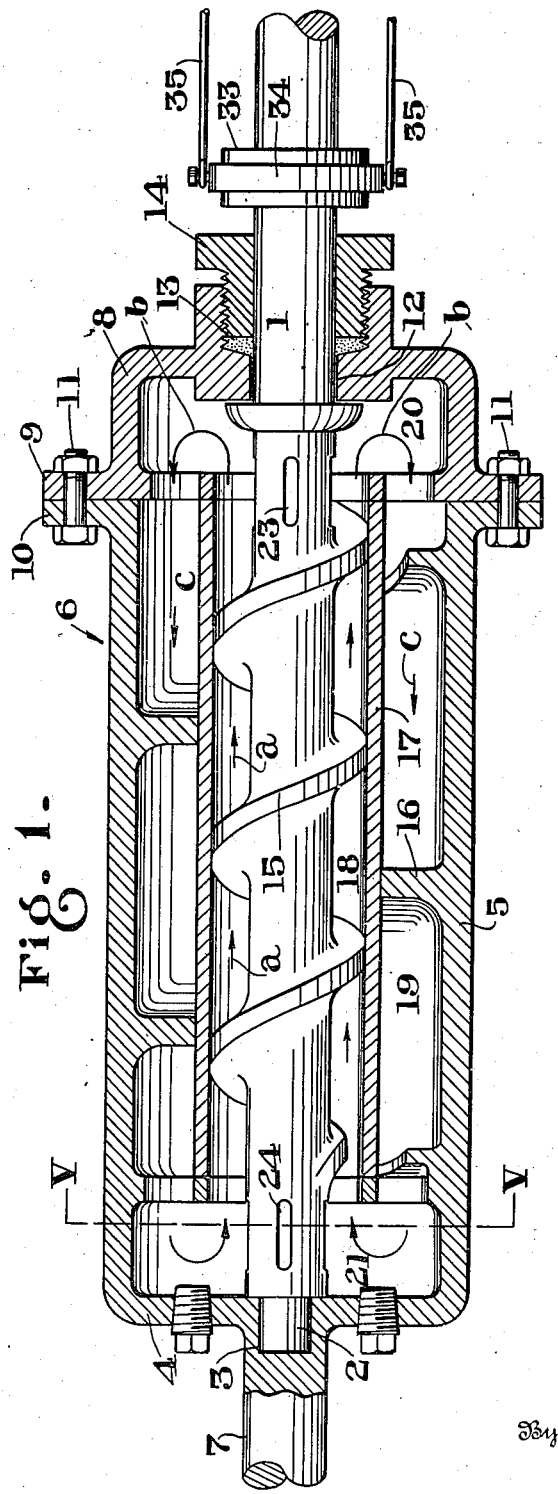
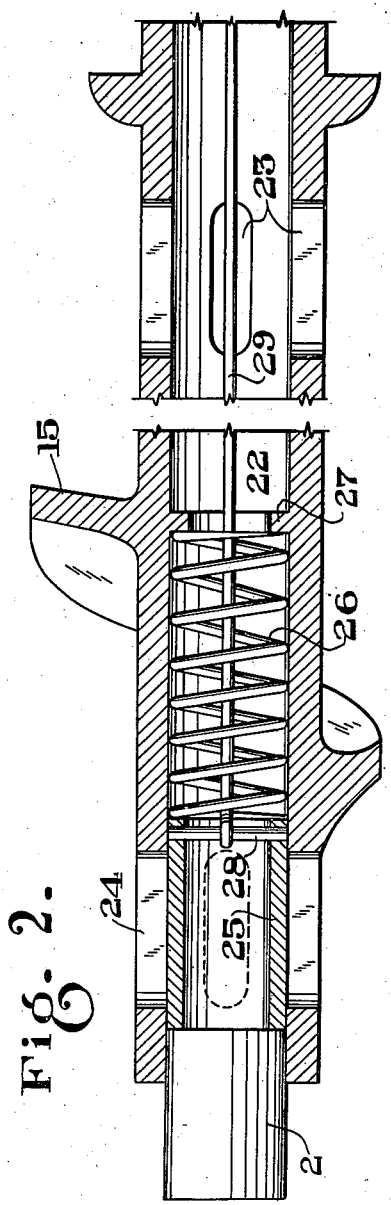
Inventor
RUSH E. MANLEY
By W. S. McDowell
Attorney July 8, 1941. R. E. MANLEY 2,248,769
FLUID POWER TRANSMISSION SYSTEM
Filed Aug. 12, 1940 2 Sheets-Sheet 2
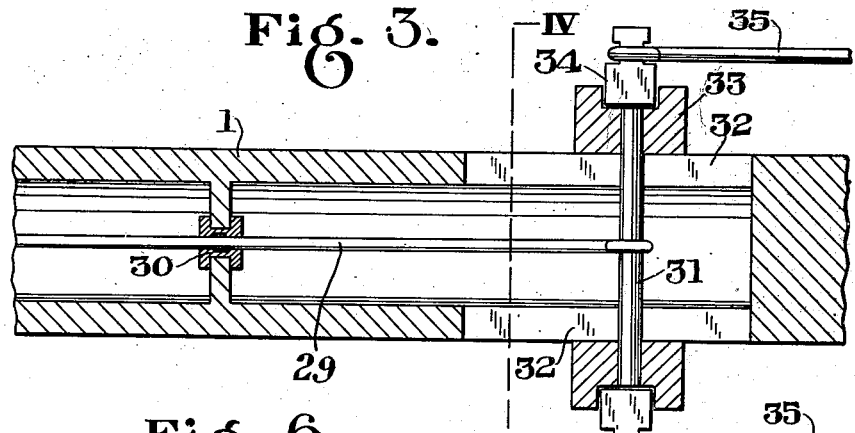
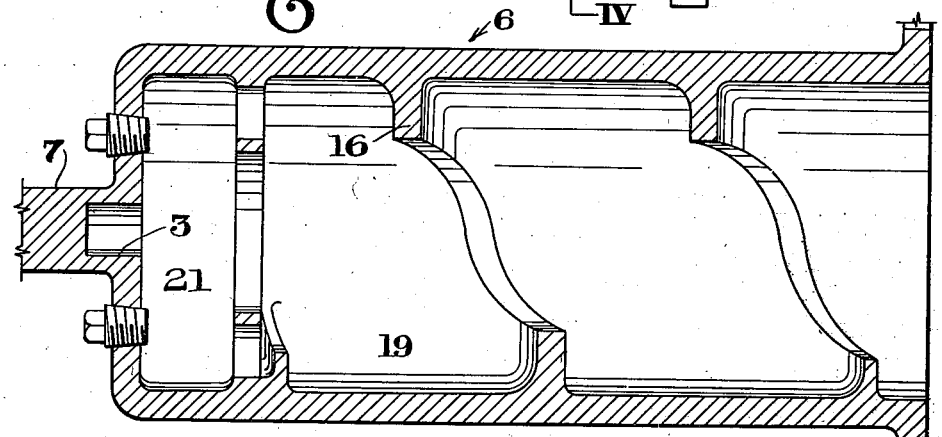
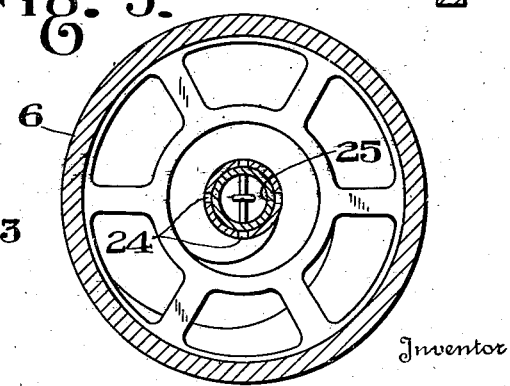
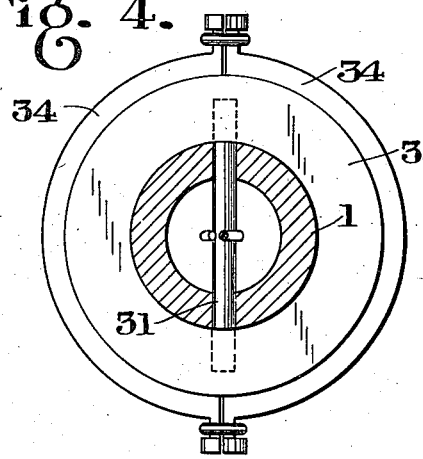
Inventor
RUSH E. MANLEY
By W. S. McDowell
Attorney Patented July 8, 1941

2,248,769

UNITED STATES PATENT OFFICE 2,248,769

FLUID POWER TRANSMISSION SYSTEM

Rush E. Manley, Columbus, Ohio

Application August 12, 1940, Serial No. 352,241

6 Claims. (Cl. 60—54)

The present invention is particularly concerned with an improved hydraulic transmission, wherein motion is imparted from a driving to a driven member by the employment of a fluid medium which is forced under pressure through confined passages or channels provided in the transmission between the driving and driven members.

An object of the invention is to provide an improved transmission of this category wherein the transmission fluid, by the rotation of a driving member, is forced or pumped through a spiral channel or channels formed in conjunction with the driven member, whereby to cause the controlled rotation of the latter.

A further object of the invention resides in the provision of manually controlled valve means for diverting or by-passing the flow of the fluid medium through the spiral channel or channels of the driven member, in order to control the rotation of the driven member with respect to the driving member.

A still further object of the invention resides in the provision of an hydraulic transmission mechanism composed of few and simple parts, which are positive and efficient in operation and not likely to become out of order or occasion repairs.

For a further understanding of the invention, reference is to be had to the following description and the accompanying drawings, wherein:

Fig. 1 is a horizontal sectional view taken through the improved hydraulic transmission comprising the present invention;

Fig. 2 is a similar view, on a somewhat larger scale, taken through one end of the driving member of the transmission and its associated valved fluid by-passing means;

Fig. 3 is a similar view of the driving member, disclosing the operating mechanism carried thereby for effecting the actuation of the fluid by-passing valve;

Fig. 4 is a transverse sectional view taken on the plane disclosed by the line IV—IV of Fig. 3;

Fig. 5 is a vertical transverse sectional view taken on the plane disclosed by the line V—V of Fig. 1;

Fig. 6 is a horizontal sectional view taken through the fluid drum or casing of the driven member of the transmission.

Referring more particularly to the drawings, the numeral 1 designates the driving member of my improved transmission or power transmitting device. This driving member may take the form of a shaft, which is adapted to be rotated by any suitable prime mover, not shown. The outer end of the shaft is reduced in diameter as at 2, and is journaled and supported for rotation in a bearing socket 3, provided in the end wall 4 of the drum-like casing 5 of the driven member 6 of the transmission. Beyond the wall 4, the casing 5 continues with a shaft-like extension 7, which is adapted to be journaled and associated with power take-off devices, not shown, of any suitable type.

The casing 5, at its other end, is provided with a removable head 8, the latter being formed with an out-turned annular flange 9, which registers with a corresponding flange 10 formed on the forward end of the casing 5, the flanges 9 and 10 being formed with registering openings for the reception of threaded bolting devices 11. The head 8 is formed with a bearing 12 through which the driving shaft 1 passes, said bearing being provided with a packing 13, clamped by a threaded nut 14, so that the packing will be held in fluid-retaining engagement with the driving shaft.

The driving shaft, within the confines of the casing 5, is formed with helical screw-like vanes 15, while the interior of the casing 5 is provided with inwardly projecting, correspondingly formed vanes 16, the latter, however, extending in a reverse order with respect to that of the vanes 15. Disposed between the outer edges of the vanes 15 and the inner edges of the vanes 16 is an open-ended tube or sleeve 17, the latter having close engagement with the contacting edge portions of said vanes. By the provision of the tube 17, the transmission is provided with a longitudinally extending inner fluid passageway 18 and an outer parallel and concentrically disposed fluid passageway 19. Both of these passageways comprise helical channels by the presence therein of the vanes 16 and 17. In addition, said passageways are in relative open communication at their ends by the inclusion of the chamber 20 in the head 8 and the chamber 21 at the other end of the casing 5, the said passageways being separated by the open ended tube or sleeve 17. A working fluid is received within the casing to completely fill the passageways and chambers provided therein.

In operation, the shaft 1, which is connected to the source of power may rotate at high speed within the tube 17 in a clockwise direction. This causes the fluid contained within the passageway 18 to be positively advanced in the direction indicated by the arrows $a$, displacing fluid from the passageway 18 into the chamber 20 and thence into the outer passageway 19, as indicated by the arrows b. The fluid thus displaced is forced under comparatively high pressures through the outer passageway 19 in the general direction indicated by the arrows c, causing the fluid during its travel through the passageway 19 to contact the vanes 16 and thereby rotate the casing 5, also in a clockwise direction.

The carrying capacity for the transmitting of fluid by the passageways 18 and 19 is determined by the length, pitch and cross-section of the vanes 15 and 16 in each. It will be understood that the length, pitch and cross-section of said vanes or blades may be adjusted or modified to produce the greatest efficiency of operation and desired results, depending upon the size and purposes to which the transmission is placed. For present purposes, it is assumed that each of the vanes 15 and 16 will pass around its respective axis at least once at a pitch angle of about 45 degrees.

In order to vary the rotational speed of the driven member of the transmission with respect to the driving member, a means is provided for diverting the forced flow of the working fluid in part or in whole from the outer passageway. This is accomplished by the provision of an axial passageway 22 formed in the driving member 1. This passageway communicates with slots 23 and 24, the latter registering respectively with the chambers 20 and 21. Normally, the slots 24 are covered by a tubular valve member 25, which is mounted for sliding movement in one end of the passage 22. A coil spring 26 is arranged in the passageway 22 and bears at one end on a stationary seat 27 and on the other end on the valve member 25, maintaining the latter in position to close the slots 24 to obstruct fluid flow therethrough and keeping the valve member in contact with the inner end of the reduced bearing extension 2 of the driving member 1.

To move the valve member to a position to open the slots 24, a pin 28 passes transversely through the valve member and is connected with a pull rod 29. This rod, as shown in Figs. 2 and 3, passes axially through the passage 22, being supported intermediately of its length in a packed gland 30 and having its end, opposed to that joined with the valve member, connected with a pin 31. This pin passes through slots 32 formed in the driving member 1 at a position exteriorly of the casing 5, the opposite ends of the pin 31 being received within a grooved collar 33 slidably mounted on the outer end of the driving member 1. Arcuate rings 34 are received within the annular groove formed in the outer periphery of the collar 33 and have their adjoining ends united with pull rods 35, the latter extending to any suitable actuating device, not shown, for sliding the collar 33, in order that the rod 29 may be moved to actuate the valve member 25 against the resistance of its spring 26. By this construction, the collar 33 may rotate in unison with the driving member 1 and yet may be slidably actuated through the provision of the rings 34 to control the working positions of the valve member.

It will be understood that when the valve member is moved to a position to partially or fully uncover the slots 24, more or less of the working fluid will be diverted from the outer passageway 19 through the slots 23, and by following a course of lessened resistance, will flow through the passageway 22, and thence through the slots 24 into the fluid entrance end of the passageway 18. When the slots 24 are open to a maximum degree, the driven member will cease to rotate, enabling the driving member to idle, and stopping the operation of mechanism driven by the driven member. When the slots 24 are but partially uncovered, the rotational speed of the driven member will be reduced when compared with that of the driving member.

The fluid by-pass thus provided controls the speed of rotation and torque of the driven member.

What is claimed is:

1. Hydraulic clutch mechanism comprising relatively rotatable driving and driven members disposed in concentric relation, a screw formed on one of said members, a fluid-containing drum formed with the other of said members, a tubular separator surrounding said screw and coextensive therewith, said separator dividing said drum internally into concentric parallel inner and outer fluid passageways, said passageways being in constantly open relative communication at their ends for unobstructed fluid flow therebetween, spiral vanes projecting inwardly from the outer wall of said drum and positioned in said outer passageway, and valve controlled means providing for a variable by-passing of fluid with respect to one of said passageways.

2. Fluid controlled power transmitting mechanism comprising relatively rotatable and concentrically disposed driving and driven members, one of said members having a fluid-containing chamber formed therein, a screw-like formation provided on the other of said members, a longitudinally extending tubular separator surrounding the screw-like formation and positioned in said chamber in concentric relation to the longitudinal axis thereof, said separator providing inner and outer fluid circulating passageways, said passageways being in constantly open relative communication at their ends, spiral vanes formed with and projecting inwardly from the outer wall of said chamber, said vanes occupying the outer of said passageways, and valve-controlled means for effecting a variable by-passing of fluid with respect to the outer passageway.

3. Hydraulic clutch mechanism comprising relative rotatable driving and driven means disposed in concentric relation, a fluid-containing drum formed with one of said members, a tubular separator arranged within said drum in concentric relation with its longitudinal axis and dividing the drum internally into concentric inner and outer fluid circulating passageways, means rotatable with the other of said members for effecting positive advancement of fluid from the inner of said passageways to and through the outer passageway, sprial vane means carried by said drum and disposed in the outer passageway for effecting the rotation of said drum upon the passage of fluid through said outer passageway, said passageways being in constant relative communication at their ends for unobstructed fluid flow therebetween, and valve controlled means for effecting a variable by-passing of fluid around the outer passageway.

4. Hydraulic clutch mechanism comprising a power delivery shaft formed with a screw-like portion adjacent to one end thereof, a driven member including a fluid-containing drum supported by and rotatable about the longitudinal axis of said shaft, a longitudinally extending tubular separator closely surrounding the screw-like portions of said power shaft and forming in conjunction therewith spiral channels for the positive advancement of fluid contained within the drum in a predetermined direction through the separator, said separator possessing a smaller diameter than the internal diameter of said drum to provide an annular longitudinally extending fluid passageway between said separator and the outer wall of the drum, spiral vanes carried by the drum, said vanes projecting inwardly of the drum for engagement of the outer wall surfaces of the separator and disposed in said passageway, and valve-controlled means providing for a variable by-passing of fluid with respect to the passageway.

5. Hydraulic clutch mechanism comprising relatively rotatable driving and driven members disposed in concentric relation, a screw formed on said driving member at one end thereof, a fluid-containing drum formed with the driven member, said drum being rotatably mounted on said driving member, a longitudinally extending open-ended tubular separator arranged within said drum around said screw and coextensive with the latter, said separator dividing said drum internally into concentric parallel inner and outer fluid passageways, the latter being in constantly open communication for unobstructed fluid flow therebetween at the ends thereof, spiral vanes projecting inwardly from the outer wall of said drum and operative upon the rotation of said screw and the flow of fluid through said outer passageway to effect the rotation of said drum and said driven shaft, and valve-controlled means disposed in said driving shaft providing for a variable by-passing of fluid around said outer passageway.

6. Hydraulic clutch mechanism comprising a driving member formed with a screw-like formation at one end thereof, a driven member including a fluid-containing drum rotatably mounted on said driving member in concentric relation with respect thereto, a longitudinally extending open-ended tubular separator positioned in said drum around said screw-like formation and co-extensive therewith, said separator dividing said drum internally into concentric parallel inner and outer fluid circulating passageways, said passageways being in constantly open relative communication at their ends for unobstructed fluid travel therebetween, spiral vanes projecting inwardly from the outer wall of said drum and positioned in said outer passageway and operative upon the advancement of fluid through said outer passageway to effect the rotation of said drum and driven member, a fluid by-pass extending through said driving member, said by-pass communicating with said passageways at their ends, and manually operated valve-controlled means for regulating the passage of fluid through said by-pass.

RUSH E. MANLEY.